United States Patent [19]

Kelch et al.

[11] 3,913,136

[45] Oct. 14, 1975

[54] LATCHING ARRANGEMENT FOR A RECORDING DEVICE

[75] Inventors: Heinz Kelch, Buchenberg; Eduard Schuh, Villingen, both of Germany

[73] Assignee: Kienzle Apparate G.m.b.H., Villingen, Germany

[22] Filed: Jan. 21, 1974

[21] Appl. No.: 434,980

[30] Foreign Application Priority Data

Jan. 24, 1973 Germany ............................ 2303321

[52] U.S. Cl. ...................................... 360/96; 346/41

[51] Int. Cl.$^2$ ...................... G11B 23/08; G01D 9/03

[58] Field of Search .......... 346/74 E, 74 CH, 74 ES, 346/41, 63; 360/92, 93, 96

[56] References Cited

UNITED STATES PATENTS

| | | | |
|---|---|---|---|
| 3,545,004 | 12/1970 | Alden | 346/74 E |
| 3,609,844 | 10/1971 | Ichikawa | 360/96 |
| 3,764,089 | 10/1973 | Yoshida | 360/96 |
| 3,766,327 | 10/1973 | Johnson et al. | 360/96 |
| 3,800,324 | 3/1974 | Nakamichi | 360/96 |

FOREIGN PATENTS OR APPLICATIONS

| | | | |
|---|---|---|---|
| 8,508 | 4/1913 | United Kingdom | 346/41 |

*Primary Examiner*—Terrell W. Fears
*Assistant Examiner*—Jay P. Lucas
*Attorney, Agent, or Firm*—Michael S. Striker

[57] ABSTRACT

A housing has a cover which is pivotable between an open and a closed position. A lock is movable to and from a locking mode in which it locks the cover in the closed position thereof. A cassette is carried by the cover for movement with the same and includes a take-up hub which is turnable to take up a strip-shaped record carrier that is stored in the cassette. Recording electrodes are provided in the housing for recording information on the carrier, and a drive is provided for rotating the hub. A motion-transmitting arrangement is coupled with the lock and serves to shift the cassette to an operating position in which the hub is rotated by the drive and in which the electrodes record on the carrier, in automatic response to movement of the lock to its locking position.

11 Claims, 4 Drawing Figures

LATCHING ARRANGEMENT FOR A RECORDING DEVICE

BACKGROUND OF THE INVENTION

The present invention relates generally to a recording device, and more particularly to a device for making electrographic recordings of measured values on a strip-shaped record carrier.

Recording devices for making recordings of measured data and values on a strip-shaped recording carrier are already known. Recently, there has been a movement towards the use of cassettes with such devices, the record carrier being accommodated in the cassette in the manner in which magnetic tape is accommodated in recording cassettes of audio and video recorders. The reason for this trend is, self-evidently, that the record carrier can be handled much more easily if it is accommodated in a cassette than if, following the previous practice, it is simply loosely wound onto a reel. Particularly if the recordings on the carrier are to be automatically read out, and if for instance an automatic feed of the carrier to a reading station is intended, then the accommodation of the carrier in a cassette is of great help in handling and storing the carrier. Moreover, if the carrier is accommodated in a cassette it is of course largely protected against mechanical damage and can also be stored and sorted much more readily.

It was thought at first that it would be a simple matter of transferring the technology developed in connection with audio and video cassettes, for use with cassettes having record carriers for the electrographic recording of measured values. However, it has been subsequently found that in many instances the operation of these prior-art devices employing audio and video cassettes requires a number of manipulations on the part of the user, which is undesired in the particular application with which the invention is concerned. Also, in many instances these prior-art devices are technically complicated and expensive, or confusing as to their operation.

It is for instance known from the prior art to release and eject an audio cassette by depressing the stop button of a recorder twice in succession, or to provide a special lever arrangement which is coupled with the handle to the recorder and will eject the cassette when the handle is pulled. In other types of recorders, special ejecting buttons are provided, and in still others the structural features required to properly position the cassette are undesirably complicated.

Moreover, there is a further consideration which has prevented the transfer of video-cassette or audio-cassette technology to the electrographic recording field, namely the fact that it is required that the record carrier in a cassette for electrographic recording be so visible that the recordings be clearly exposed for viewing at all times. This means that in an electrographic recorder the cassette must be arranged in a special manner not known from and not suggested in the audio or video-cassette recorder technology. Moreover, unlike audio and video recorders using cassettes, electrographic recorders are as a rule required to be lockable in order to prevent access by unauthorized persons to the cassette carrying the recorded information, because in many instances such information must be protected against alteration or falsification.

SUMMARY OF THE INVENTION

It is, accordingly, a general object of the present invention to overcome the disadvantages of the prior art.

More particularly, it is an object of the present invention to provide an improved recording device of the type under discussion, which avoids these disadvantages.

An additional object of the invention is to provide such an improved recording device which is considerably simpler than what is known from the prior art, both structurally and in the manner in which it must be handled.

A further object of the invention is to provide such an improved recording device wherein the operations required for changing record carriers are reduced to a minimum and the possibility of subjective errors on the part of an operator is largely eliminated.

A concomitant object of the invention is to provide such an improved record device wherein the recordings made on the record carrier are clearly visible at all times.

Still another object of the invention is to provide such a record device wherein the record carrier can be protected against access by unauthorized persons.

In keeping with the above objects, and with others which will become apparent hereafter, one feature of the invention resides in a recording device, particularly for the electrographic recording of measured values, which briefly stated comprises a housing having a cover movable between an open and a closed position, and latching means movable to and from a latching mode in which it latches the cover in the closed position thereof. A cassette is carried by the cover for movement with the same and includes a take-up hub which is turnable to take up a strip-shaped record carrier that is stored in the cassette. Recording means is provided in the housing for recording information on the carrier, and drive means is also provided in the housing for rotating the hub. Motion-transmitting means is coupled with the latching means for shifting the cassette relative to the cover and the housing to an operating position in which the drive rotates the hub and the recording means on the carrier, in automatic response to movement of the latching means to the latching mode subsequent to movement of the cover to the closed position thereof.

Thus, the device according to the present invention assures that if, for instance, the latching means is in form of a key-operated lock, a single movement of the key causes the inserted cassette to be locked against access by unauthorized persons, to be moved to a position in which the recording means can record data on the record carrier in the cassette, and engagement of the hub with the drive so that the record carrier can be transported. This means, in effect, not only that the cassette and the record carrier therein are protected against access by unauthorized persons, but also that unauthorized persons (if for some reason they should gain access to the cassette) cannot operate the device since they cannot cause the hub to be engaged with the drive means in the absence of the key.

It is currently preferred that the cover be provided with a pocket-shaped receptacle into which the cassette can be inserted, which is a structure that makes it particularly simple to insert or remove the cassette and which eliminates difficulties during opening and closing of the cover.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figures 1, 3:
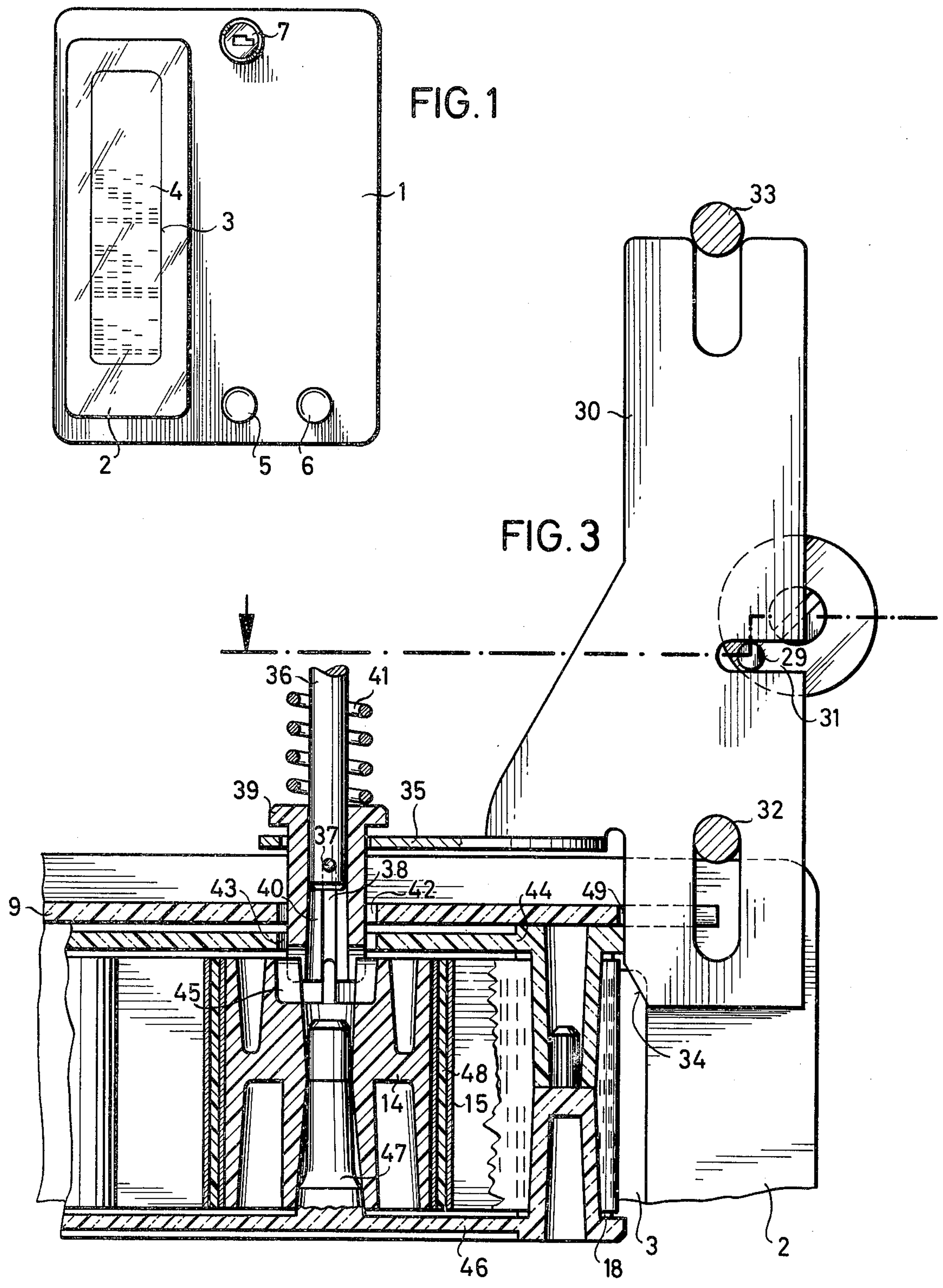
FIG. 1 is a diagrammatic top plan view of a device according to the present invention.
FIG. 3 is a partial bottom-plan view of the cassette and of associated components, with some of the components being in section.

Referring now to the drawing, it will be seen firstly that FIG. 1 shows in a somewhat diagrammatic topplan view a recording device 1 according to the present invention. The recording device 1 has a cover 2 provided with a window 3 through which the record carrier 4 is visible, the latter being provided with markings. Pushbuttons 5 and 6 serve to control the operation of the recording, and a key-operated lock 7 serves to lock the cover 2 in closed position.

Figures 2, 4:
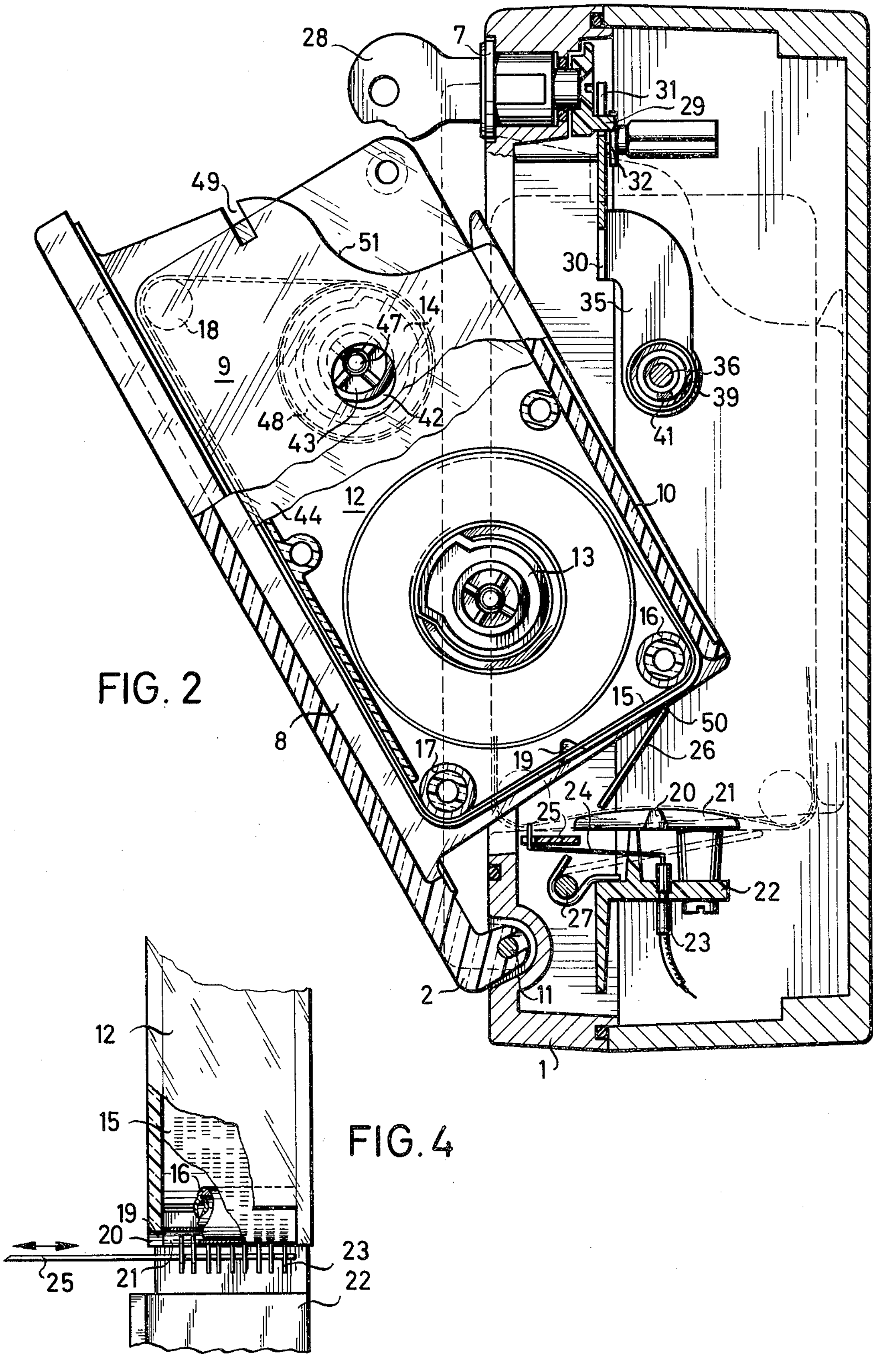
FIG. 2 is a partly sectioned view, showing details of the essential components of the device of FIG. 1 in a position in which the cover is opened.
FIG. 4 is a partial section in the recording region.

The cover 2 which preferably but not necessarily is of a transparent material, either wholly or in part, has a bottom wall portion 10 and additional wall portions 8 and 9 which together form a pocket for insertion of a cassette 12, the position of which in the cover is shown in FIG. 2. The cover is pivotal between an open and a closed position (the latter shown in FIG. 1 and the former in FIG. 2) on a pivot 11. In FIG. 2 the cassette 12 is shown partly sectioned for ease of illustration. It will be seen that it has two hubs 13 and 14 which rotate and onto which a record carrier in form of a metalized paper strip 15 is coiled. The cassette 12, together with guide rollers 16, 17, 18 and cutouts 19 serving for exact positioning of the cassette in the recording position constitutes a readily usable unit that can be easily handled.

When the cassette 12 is in the recording position, noses or projections 20 which are preferably formed on an electrode 21 extend into the cutouts 19. The electrode 21 is mounted on an insulating portion 22 which in turn is fixedly mounted on the housing of the recorder 1, and it engages the record carrier 15 when the cassette 12 is in the recording position and contacts it under a certain pressure and with as large a surface area as is possible. Electrode 21 is the counter pole with respect to the recording electrodes 24. Holders 23 for the recording electrodes 24 are also mounted on the insulating member 22; the recording electrodes 24 have free end portions which extend through slots in a comblike member 25 which is movable in direction normal to the plane of FIG. 2 in order to produce markings transverse to the driving direction on the record carrier 15.

A spring 26 is mounted on a fixed pivot 27 and has one end which engages any suitable part of the housing or part that is rigidly connected with the housing, whereas its other end acts upon the cover 2 in the manner illustrated in FIG. 2, resiliently opposing movement of the cover 2 to its closed position.

The lock 7 has a bolt 29 which can be shifted by turning a key 28. A motion-transmitting member 30 is connected via a slot 31 with the bolt 29; it is in turn shiftably mounted on bolts 32 and 33 (compare FIG. 3) and has a cam surface 34 and an arm 35. The latter embraces a sleeve 39 which surrounds a drive shaft 36 with which it is connected via the slot and pin connection 37, 38 and on which it is axially shiftable. One end of the sleeve 39 is formed with a plurality of coupling projections 40, and a spring 41 surrounds the shaft 36 and acts upon the sleeve 39 in a sense permanently tending to urge the coupling projections 40 into engagements with recesses 45 in the hub 14 of an inserted cassette 12. To make this possible the wall portion 9 of the cover 2 is provided with an opening 42, and one wall 44 of the cassette 12 is formed with an opening 43. The hub 14 is turnably mounted on a shaft 47 which is formed on the opposite wall 46 of the cassette 12. By means of a tension ring 48, which is an elastic clamp, one end of the record carrier 15 is connected to the hub 14 so that the tension ring 48 supplements the hub 14 to form a cylinder, which hub is otherwise not cylindrical in section as may be seen from FIG. 2.

When the cassette 12 has been inserted into the pocket of the cover 2, the latter is moved to closed position and is locked by turning the key 28. In so doing, the motion transmitting member 30 is shifted by the latch bolt 29 until it enters into a slot 49 formed in the wall portion 9 of the cover 2. At the same time, the cam surface 34 shifts the cassette 12 — which is the inserted position is in abutment with the end portion 50 of the spring 26 together with at least one wall portion of the cover 2, counter to the action of the spring 26 into a recording position in which the projections 20 extend into the cutouts 19 of the cassette 12, and in which further the electrode 21 and the electrodes 24 are in contact with the record carrier 15. This end position of the cassette 12 and the spring 26 is shown in broken lines in FIG. 2.

At the same time as these movements take place, the arm 35 disengages the sleeve 39 so that the latter can move downwardly on the shaft 36 under the influence of the spring 41 (see FIG. 3) permitting the projections 40 to extend through the openings 42 and 43 into the recesses 45 of the hub 14. The pin 37 serves as an abutment for the axial movement of the sleeve 39 and at the same time as a connector between the sleeve 39 and the shaft 36 to entrain the former as the latter rotates.

Conversely, when the key is used to unlock the device and the latch bolt 29 is retracted, the motion transmitting member 30 reverses its direction and as the result the first movement that takes place is that the spring 26 shifts the cassette 12 back to its original position. Only then does it act upon the cover 2 which, after the member 30 is withdrawn from the slot 49, snaps to open position under the influence of the spring 26, thus offering the cassette 12 to an operator for withdrawal. The recesses 51 formed in the wall portions 8 and 9 are provided to facilitate a gripping of the cassette 12.

It is evident that while the lock 7 has been shown located on the housing of the device 1, it could also be provided directly on the cover 2. In this case, the engagement of the latch bolt 29 with the member 30 would come about only as the cover 2 moves into its closed position. This would actually represent a further simplification in the operation of the device and the pivotal connection of the cover 2 with the housing of the device could then be so constructed that the cover 2 might for instance assume two stable positions and would have to be pulled out of its closed position by means of a handle or by means of the key itself, rather than being biased by the spring, and would only move automatically to the fully open position after overcoming a dead-center position. It is also evident that if for any reason a lock is not required, the lock could be replaced with a simple latch, such as a slidable latch.

It will be understood that each of the elements described above, or two or more together, may also find a useful application in other types of constructions differing from the types described above.

While the invention has been illustrated and described as embodied in a recording device, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of the prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A recording device, particularly for the electrographic recording of measured values on a strip-shaped record carrier stored in a cassette having a take-up hub, comprising a housing; a cover mounted on said housing for movement with respect thereto between an open end and a closed position; means in said cover for receiving the respective cassette for movement with respect to said cover between a loosely inserted and an operative position; means for recording information on the record carrier when said cassette is in said operative position; and means operative when said cover is in said closed position for latching said cover in said closed position and for simultaneously moving said cassette relative to said cover into said operative position and into recording contact with said recording means while engaging said driving means with said take-up hub of said cassette.

2. A recording device as defined in claim 1 wherein said cover is at least in part transparent for permitting viewing of said cassette.

3. A recording device as defined in claim 1, wherein said latching means comprises a key lock.

4. A recording device as defined in claim 1 wherein said driving means comprises a drive shaft and a sleeve surrounding said drive shaft and axially slidable thereon between a disengaged first position and an engaged motion-transmitting second position; and wherein said latching means effects sliding of said sleeve between said positions thereof.

5. A recording device as defined in claim 4, wherein said latching means comprises a motion-transmitting member having an arm which engages said sleeve.

6. A recording device as defined in claim 1 wherein said receiving means includes a pocket dimensioned for removably accommodating said cassette.

7. A recording device as defined in claim 6, wherein said cover is provided with an opening communicating with said pocket for permitting access of said recording means to said carrier.

8. A recording device as defined in claim 1 and further comprising biasing means resiliently biasing said cover to said open position and opposing shifting of said cassette to said operating position.

9. A recording device as defined in claim 8, wherein said biasing means comprises a biasing spring.

10. A recording device as defined in claim 1; and further comprising mounting means mounting said cover on said housing for hinged movement between said open and closed positions.

11. A recording device, particularly for the electrographic recording of measured values on a strip-shaped record carrier stored in a cassette having a take-up hub, comprising a housing; a cover mounted on said housing for movement with respect thereto in a path between an open and a closed position; means in said cover for receiving the respective cassette to share the movement of said cover in said path and also for movement with respect to said cover between a loosely inserted and an operative position; means in said housing for recording information on the record carrier when said cassette is in said operative position; means mounted in said housing for displacement substantially normal to said path between a retracted and an extended position and operative for engaging and driving the take-up hub when in said extended position; and means operative when said cover is in said closed position for latching said cover in said closed position and for simultaneously moving said cassette relative to said cover into said operative position and also into alignment with said driving means while displacing the latter into driving engagement with said take-up hub of said cassette.

* * * * *